Feb. 2, 1943.  C. E. McKINNEY  2,309,970
PROCESS OF MANUFACTURING CARBON BLACK
Filed Oct. 23, 1939
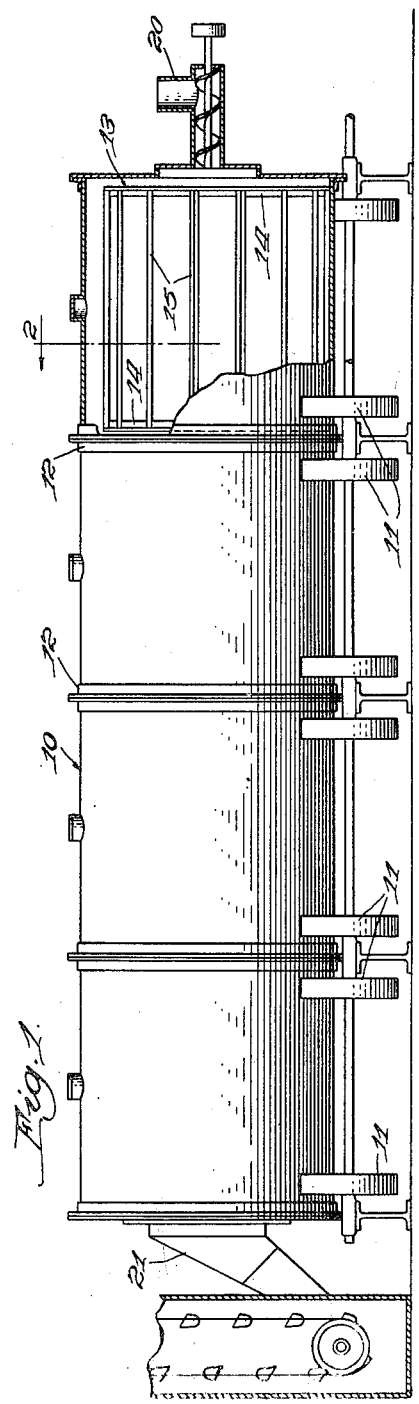
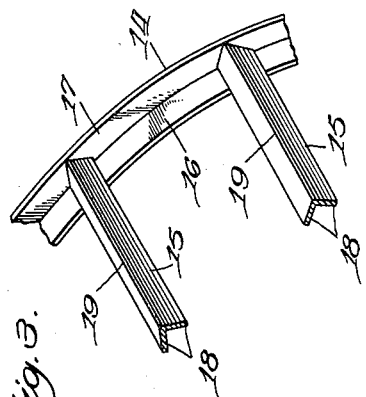
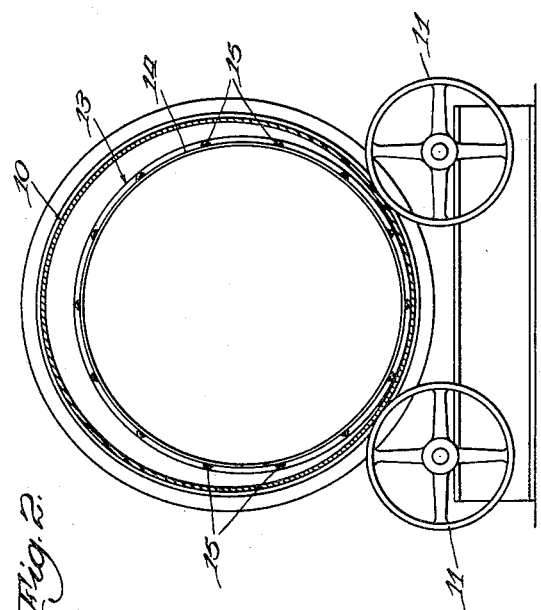
INVENTOR
Charles E. McKinney.
BY
Chritton, Wiles, Davies, Hirschl & Dawson.
ATTORNEYS Patented Feb. 2, 1943

2,309,970

UNITED STATES PATENT OFFICE 2,309,970

PROCESS OF MANUFACTURING CARBON BLACK

Charles E. McKinney, Borger, Tex., assignor to Continental Carbon Company, a corporation of Delaware Application October 23, 1939, Serial No. 300,885

4 Claims. (Cl. 23—314)

In my co-pending application, Serial No. 284,552, filed July 14, 1939, now Patent 2,256,949 issued Sept. 23, 1941 is disclosed an apparatus for the manufacture of carbon black. The present application, which is a continuation-in-part thereof, relates to a process for manufacturing carbon black, which utilizes the apparatus thereof, and to the product thereof.

The manufacture of spherical carbon black in rotating drums has heretofore been suggested, employing a number of compartments, in some instances with heavy rollers and in other instances without any rollers at all.

The use of rollers in the drums has now been discovered to be highly disadvantageous because it delays formation of carbon black pellets of the proper size and density. At the same time the cost of maintenance and expense is increased.

For example, Price Patent No. 2,127,137 indicates a drum divided into eight compartments and in addition an agitating drum containing four compartments was customarily employed with the Price device.

With the present device carbon black of the same density, for example 23 lbs. per cubic foot, can be obtained while using only four compartments of equivalent size, and without the use of any pre-agitation.

On the other hand, if no rolls at all are used in the drums, the carbon black cakes upon the sides of the drums and cuts down the available space in the drums.

As shown in my co-pending application hereinbefore referred to, ordinary scrapers cannot be readily employed on account of the nature of the drum mechanism, particularly because the drums are driven by external rollers and do not have an internal shaft upon which scrapers could be mounted.

This difficulty may be overcome, however, by the provision of a free-rolling open cylinder.

The invention is illustrated in the drawing in which Figure 1 is a longitudinal elevation of a carbon black drum cut away at one end to indicate the scraper therein; Figure 2 is a section taken along the line 2 in Figure 1; and Figure 3 is a detail perspective view of a portion of the scraper.

As shown in the drawing, the drum 10 is rotatably mounted and is driven by the rollers 11. The drum may be divided into a number of compartments as indicated by the partition grooves 12, but preferably the partitions are absent. Preferably a plurality of scrapers is employed, one scraper being utilized in each of what were formerly the compartments of the drum. However, a unitary scraper for the entire drum may be employed if desired.

The preferred scraper 13 is illustrated in the drawing and occupies one compartment of the drum 10. The scraper is made up of two rings 14 of angle iron which are connected by angle iron stringers 15 welded at suitable intervals thereon. The rings are suitably 1½" x 1½" x ¼" iron positioned so that one side 16 thereof is horizontal and provides a circumferential plate upon which the stringers may be readily secured; whereas the other angle 17 provides a limiting shoulder and also may be employed to cooperate with the grooves 12 and hold the scraper in position in its compartment.

The stringers are likewise suitably 1½" x 1½" x ¼" material and are positioned at regular intervals with both open edges 18 upon the horizontal side 16 of the rings. This leaves the points 19 of the stringers facing directly outward.

For a drum of 6 feet in internal diameter a scraper of 5 feet 9 inches maximum external diameter is preferred. Fourteen stringers, each six feet in length, mounted on the rings at approximately 26° intervals have proved satisfactory but the interval may be reduced if desired. For example, stringers at 12° intervals have likewise proved satisfactory.

In operation carbon black is fed into the drum 10 through the screw feed 20, passes therethrough, emerging at the gravity discharge 21 in the form of much denser material either in the form of hard pellets or soft pellets, as described in the co-pending application of Russell D. Weekley and Charles E. McKinney, Serial No. 253,713, filed January 30, 1939. The drum is rotated during the process, carrying with it the scraper, which, because of its smaller diameter, rotates at a greater angular velocity, thus preventing a cake from building up both by reason of the shape of the angular stringers as well as by the different speed thereof.

During operation, the drum builds up a cake of carbon black having a thickness approximately equal to the difference between the radius of the scraper and the internal radius of the drum.

The material fed into the tank is preferably like carbon black having a density of approximately 2½ lbs. per cubic foot. This material appears immediately to form relatively large spheres of carbon black, approximately the size of buckshot, which are reduced in size and increased in density as they pass through the drum. The density of the particles may be increased and conversely their size may be decreased by increasing the speed of rotation of the apparatus, or to some extent by decreasing the rate of feed thereto. Ordinarily a drum of the size indicated is rotated from 7 to 11 revolutions per minute.

When operating in the normal manner to produce dustless carbon black the product is different from carbon black material heretofore produced by either the turbulent agitation of Billings and Offutt Patent No. 1,957,314, issued May 1, 1934, or the non-turbulent rolling of the Price Patent No. 2,127,137, issued August 16, 1938. The pellets so produced have been shown by tests to be substantially stronger than those producible by either the Price or the Billings and Offutt processes by an amount of approximately 30%, and as a result show substantially less breakdown to flocculent powder during transportation.

This is probably due to the fact that the material is a unitary structure which has been gradually made more dense, rather than either a series of layers of material, as described in Billings and Offutt, or a conglomerate such as is described in the Price patent.

In the claims the term "crushing strength index" is used to indicate the ratio of crushing strength to that of either Price or Billings and Offutt dustless carbon black. An index of 2 indicates that the crushing strength is twice that of the other products.

The characteristics of the carbon black may also be controlled, as indicated in the co-pending application of Russell D. Weekley and applicant, Serial No. 253,713, filed January 30, 1939, by adjusting the size of the opening between the compartments. For the size drum here indicated, an opening 16 inches in diameter produces hard carbon black of the higher densities, whereas a larger opening, for example 24 inches, produces soft pellet carbon black of the type indicated in application Serial No. 253,713.

The material introduced into the drums is not limited to carbon black of the indicated density. Prepared or semi-prepared carbon black may be utilized or "fines" from a previous operation may be recirculated if desired. One of the advantages of the present process, however, is that the drums operate satisfactorily without the necessity of the returning of the fines thereto.

The apparatus may also be employed for the treatment of other powdery materials for the purpose of forming spheres or pellets.

The carbon black hereinbefore referred to is passed through the screw conveyor while at its naturally light density. The initial spheres or balls, which, as hereinbefore said are about the size of buckshot, are light and unable to withstand handling or transportation. As the initially light and large granules are rolled over each other, however, they become smaller and heavier and eventually reach the desired density which preferably is around 23 lbs. per cubic foot. When the density is above 20 lbs. per cubic foot, the granules will withstand transportation and handling.

What I claim as new, and desire to secure by Letters Patent, is:

1. The method which comprises introducing carbon black of a density of approximately 2½ pounds per cubic foot upon a moving surface which gradually increases its angle with the horizontal, in the absence of compressive forces, whereby relatively large agglomerations of carbon black are formed, and then causing successive portions of a mass of such particles to shift slowly by gravity over such moving surfaces, whereby the particles continually approach and exceed the angle of repose and move upon each other, progressively contacting the various points of the moving surface with a gravity pressed linear scraping surface, moving the moving surface with respect to the scraping surface during such contact, and continuing the process until the entire mass forms into substantially uniform particles of a density of above twenty pounds per cubic foot.

2. The method which comprises introducing naturally light carbon upon a moving surface which gradually increases its angle with the horizontal, in the absence of compressive forces, whereby relatively large agglomerations of carbon black are formed, and then causing successive portions of a mass of such particles to shift slowly by gravity over such moving surfaces, whereby the particles continually approach and exceed the angle of repose and move upon each other, progressively contacting the various points of the moving surface with a gravity pressed linear scraping surface, moving the moving surface with respect to the scraping surface during such contact, and continuing the process until the entire mass forms into substantially uniform particles of a density of above twenty pounds per cubic foot.

3. In the method of producing carbon black by rotation of an enclosed horizontal drum wherein the carbon black gradually increases its angle with the horizontal in the absence of compressive forces and successive portions of the mass are caused to shift slowly by gravity over the inner wall of the drum and over each other; the steps of introducing as charge to the drum carbon black sufficiently low in density to adhere firmly to the inner wall of the drum and to form, in the absence of positive methods of removal, a thick cake thereon; positively removing from the wall of the drum during rotation thereof accretions so forming to limit the size of cake formed, and continuing the process until the entire mass has formed into substantially uniform particle of a density above 20 lbs. per cubic foot.

4. The process of forming carbon black surfaces which comprises loosely agglomerating naturally light carbon black material by causing successive portions of a mass of such naturally light carbon black to shift slowly by gravity in the absence of compressive forces, whereby the particles continually approach and exceed the angle of repose and move upon each other forming light generally spherical globules of relatively large size, then causing the so formed globules to shift slowly by gravity upon each other in the absence of compressive forces, removing by positive action from the moving surfaces excess carbon black adhering thereto, and continuing the process until substantially uniform relatively small spheres are produced.

CHARLES E. McKINNEY.